United States Patent Office 3,480,560
Patented Nov. 25, 1969

3,480,560
CURING CATALYST
Joseph A. Vasta, Sharon Hill, Pa., assignor to E. I. du Pont de Nemours and Company, Wilmington, Del., a corporation of Delaware
No Drawing. Original application Feb. 16, 1965, Ser. No. 433,207, now Patent No. 3,347,951. Divided and this application July 25, 1967, Ser. No. 662,253
Int. Cl. C07c 87/30
U.S. Cl. 252—426                                                  6 Claims

ABSTRACT OF THE DISCLOSURE

A curing catalyst consisting essentially of a mixture of two quaternary ammonium salts, each having a cation with the structural formula

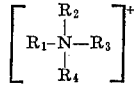

wherein $R_1$ is a $C_{12}$ to $C_{20}$ straight chain alkyl group, and $R_2$, $R_3$ and $R_4$ are individually selected from the group consisting of hydrogen and $C_1$ to $C_8$ alkyl groups, one of the organic anions of said salts being (A) an anion of a tertiary carboxylic acid having the structural formula

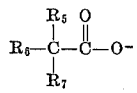

wherein $R_5$ is methyl and $R_6$ and $R_7$ are individually $C_1$ to $C_{12}$ straight chain alkyl groups, and the other anion being (B) an anion of a dialkyl sulfosuccinate having the structural formula,

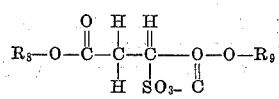

wherein $R_8$ and $R_9$ are $C_8$ to $C_9$ alkyl groups, the curing catalyst mixture having from 1 to 3 parts by weight of the quaternary ammonium salt of anion (A) to 1 part by weight of the quaternary ammonium salt of anion (B). This curing catalyst is useful in providing a curing means for blends of a carboxy-containing addition polymer and a vic-epoxy resin because it prevents binder cure at low temperatures and increases the curing rate at elevated temperatures thereby making it possible to provide a practical coating composition in one package, said composition being suitable for application even after storage for extended periods.

---

This application is a division of application Ser. No. 433,207, filed Feb. 16, 1965, now U.S. Patent No. 3,347,951.

This invention relates to coating compositions and more particularly to catalytic curing agents used in coating compositions.

A wide variety of compounds are known to be useful in promoting cure of coating compositions of such mixtures as epoxy resins and carboxy-containing adition polymers. Since coating compositions are frequently cured at temperatures on the order of 300° F., the inherent demands on a catalyst are that it be active in promoting a uniform cure at an elevated temperature and inactive at room or storing temperatures. Obviously, any substantial cure of the coating composition at room temperature will seriously detract from its uniformity and application properties. To avoid the possibility of premature cure it has been customary to package the coating composition and curing catalyst separately and subsequently mix them immediately before application. Needless to say, this procedure while assuring the absence of package cure is unsatisfactory from the viewpoint of convenience and the possible risks of catalyst nonuniformity when packages are mixed.

According to the present invention, there is provided a coating composition having (1) a binder consisting essentiallly of blend of (a) a carboxy-containing addition polymer having an acid number between 10–150 and (b) a vic-epoxy resin having an average of more than one 1,2-oxirane moieties per moleoule and a 1,2-oxirane equivalent weight of up to 1500, wherein the proportions of (a) and (b) are such that the mole ratio of carboxy groups to 1,2-oxirane moieties is in the range from 0.1 to 4; and (2) 0.1 to 1 weight percent, based on the binder, of a synergistic curing catalyst consisting essentially of a mixture of two quaternary ammonium salts, each having a cation of the structure:

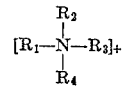

wherein $R_1$ is a $C_{12}$ to $C_{20}$ straight chain alkyl group and $R_2$, $R_3$ and $R_4$ are individually selected from the group consisting of hydrogen and $C_1$ to $C_8$ alkyl groups, one of the organic anions of said salts being (A) an anion of a tertiary carboxylic acid having the structure:

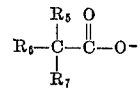

wherein $R_5$ is methyl and $R_6$ and $R_7$ are individually $C_1$ to $C_{12}$ straight chain alkyl groups, and the other anion being (B) an anion of a dialkyl sulfosuccinate having the structure:

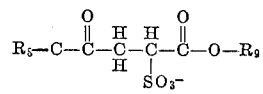

wherein $R_8$ and $R_9$ are $C_8$ to $C_9$ alkyl groups, the synergistic curing catalyst mixture having from one to three parts by weight of the quaternary ammonium salt of anion (A) to one part by weight of the quaternary ammonium salt of anion (B). By the synergistic effect of the catalyst of this invention which prevents binder cure at low temperatures and increases the curing rate at elevated temperatures, it is possible to provide a practical coating composition of the type mentioned, in one package, which composition is suitable for application even after storage for extended periods.

The synergistic catalyst of this invention is formed from a mixture of two salts both having quaternary ammonium cations. Operative quaternary ammonium cations can be represented by the structural formula:

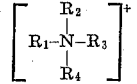

The radical substituents in the above structure must be such that at least one of them is a straight chain alkyl group having from twelve to twenty carbon atoms. The other substituents can be individually either hydrogen atoms or alkyl groups having from one to eight carbon atoms. For the purposes of this invention, the term alkyl group, without the limitation solely to straight chain alkyl groups, includes the straight chain alkyl groups and all branched isomers thereof. For example, an alkyl group having from one to four carbon atoms ($C_1$ to $C_4$ alkyl group) can be methyl, ethyl, propyl, butyl, and isopropyl. Due to the ready solubility in aromatic solvents, preferred quaternary ammonium cations are those having one $C_{14}$ to $C_{18}$ straight chain alkyl group with the remaining three substituents being individually $C_1$ to $C_4$ alkyl groups preferably all three being methyl. The octodecyltrimethyl ammonium cation has been used effectively in this invention. A convenient source of suitable cations are those commercially sold as quaternary ammonium chlorides under the Armour Chemical Division trademark of "Arquads," such as "Arquad–18" which consists predominantly of octodecyltrimethyl ammonium chloride. Table 1 of U.S. Patent 3,065,195 presents other suitable "Arquads." The "Arquad" salts are generally supplied at from 33%–75% active concentration in aqueous isopropanol.

To obtain a catalyst mixture having the desired property of retarding coating cure at storage temperatures and enhancing a uniform cure at elevated temperatures, the anionic portion of the catalytic salts mixture must be carefully chosen. One of the anions, conveniently designated as anion (A), corresponds to a tertiary monocarboxylic acid and has the structure:

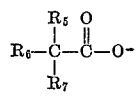

At least one of the radical substituents is a methyl group and the remaining radical substituents are individually $C_1$ to $C_{12}$ alkyl groups with preference being given to straight chain alkyl groups such that the sum of the carbon atoms in the remaining two radicals is about six to eight. Versatic 911," a tertiary acid made by Shell Chemical Company, has been used effectively to provide the anion (A). This acid is characterized as being almost entirely (90% or more) tertiary, having at least one methyl substituent and the other substituents being straight chain alkyl groups with the total carbon atoms content of the acid being about nine to eleven. "Versatic 911" is also characterized by an acid value (mg. KOH/g.) of 300 and a viscosity at 20° C., of 42.5. centistokes determined by ASTM method D 445–53T.

The other quaternary ammonium salt used in the catalytic mixture contains an anion, conveniently designated as anion (B), having the structure:

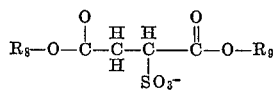

and corresponding to alkyl sulfosuccinates. The groups, $R_8$ and $R_9$, are limted to alkyl groups with eight or nine carbon atoms and can be n-octyl, n-nonyl or their branched isomers. Thus, suitable anions for salt (B) can be those corresponding to dioctanesulfosuccinate, dinonanesulfosuccinate, di-2-ethylhexylsulfosuccinate and additionally all those sulfosuccinates having the above structure where the $R_8$ and $R_9$ groups are any of the octyl or nonyl isomers. It is not essential that the $R_8$ and $R_9$ alkyl groups be identical, however, present ease in availability makes the dialkyl sulfosuccinates particularly preferred.

A convenient and preferred source of the anion (B) is the sodium salt of "Aerosol" OT 100% (American Cyanamid) which is said to be a nearly pure (99.5–100%) nontoxic, nonvolatile, practically odorless di-2-ethylhexyl ester of a sulfonated dicarboxylic acid having a solubility in water of 1.5 g./100 cc. at 25° C. and 5.5 g./100 cc. at 70° C.

The catalytic quaternary ammonium salts of this invention can both be conveniently prepared by conventional methods, such as mixing and heating the previously indicated sources of the ionic constituents dissolved in suitable solvents. For subsequent addition of the catalytic salts to the binder composition, it is desirable to have the salts in a dissolved, practically nonaqueous (i.e., less than one weight percent of water) solution from which precipitated reaction by-products have been removed. The weight ratio of the catalytic mixture of the salts having the the anions (A) and (B) is critical in order to obtain the desired synergistic curing effect. Generally, if the ratio of the salt with anion (A) to the salt with anion (B) exceeds 3 to 1, curing will commence too soon and proceed too rapidly resulting in decreased package stability and nonuniform surface adhesion of the coating. A ratio below 1 to 1 produces a curing rate too slow at practical curing temperatures. For excellent package stability at room temperature and a fast and uniform curing rate at an elevated temperature (i.e., 250° F. to 450° F.), a weight ratio of anion (A) salt to anion (B) salt of about 2 to 1 is preferred. The catalytic mixture of salts is effective as a curing agent at anywhere from 0.1 to 1.0 weight percent of the mixture based on the binder with the preferred range from 0.3% to 0.5%. Examples I and II set forth suitable examples of the preparation of catalytic salts of anions (A) and (B):

EXAMPLE I.—CATALYTIC SALT WITH ANION (A)

| | Parts by weight |
|---|---|
| "Versatic 911" acid | 27.48 |
| "Arquad–18" (50% in isopropanol) | 8.12 |
| Isopropanol | 13.90 |
| Sodium hydroxide | 1.62 |
| Xylol | 51.12 |
| Total | 102.24 |
| Salt & water loss | −2.24 |
| | 100.00 |

The above ingredients are mixed and heated to about 150° F. and stripped of the water resulting from the reaction. Sodium chloride precipitates and is removed by filtration. The resulting solution contains about 20% of the catalytic salt.

EXAMPLE II.—CATALYTIC SALT WITH ANION (B)

| | Parts by weight |
|---|---|
| Sodium dioctyl sulfocucinnate ("Aerosol" OT–100%) | 12.19 |
| "Arquad–18" (50% in isopropanol) | 18.79 |
| Isopropanol | 20.60 |
| Xylol | 50.00 |
| Total | 101.58 |
| Salt loss | −1.58 |
| | 100.00 |

The above ingredients are mixed and heated to about 150° F. Sodium chloride precipitates and is removed by filtration. The resulting solution contains about 20% of the catalytic salt.

The catalytic mixture of this invention can be used effectively in a wide variety of coating binders. The most common coating binders are those which at room temperature are blends consisting essentially of carboxy-containing addition polymers and epoxy resins.

The term "consisting essentially of" as used in this invention means that the named materials are essential but that other compounds which do not detract substantially from the basic properties of the composition can also be present. For example, the coating binder blend is recited as consisting essentially of addition polymers and epoxy resins, however, it may additionally contain other compounds, such as urea/formaldehyde resins which do not substantially detract from the synergistic effect of the curing catalyst in the composition. Also, as used in this invention, the term carboxy means —COOH. The addition polymer is made up of monomeric units chosen from a wide selection of carboxy-supplying monomers and carboxy-free monomers. The carboxy-supplying monomers are generally unsaturated carboxylic acids, having one or two carboxy substituents per molecule and at least one $\alpha, \beta$-double bond. Suitable carboxy-containing monomers are those carboxylic acids having from three to eight carbon atoms (i.e., $C_3$ to $C_8$), such as acrylic acid, maleic acid, itaconic acid and homologues of these acids having $C_1$ to $C_3$ carbon atoms substituents on the $\alpha$ carbon atom. Thus, methacrylic acid, ethyl acrylic acid, propyl acrylic acid, isopropyl acrylic acid, methylmaleic acid, dimethylmaleic acid, etc., are useful. Their easy availability makes acrylic acid and methacrylic acid particularly preferred.

The carboxy-free monomers while having the requirement of vinyl unsaturation can be selected over a wide range. For a coating possessing the desirable characteristics of attractiveness, economy, and high resistance to common stains, such as grease spots, vinyl-unsaturated monomers, of the styrene type are preferred. As used in this invention the term styrene type monomer means styrene and vinyl toluene. However, other vinyl unsaturated monomers can replace some or all of the styrene type monomer depending upon the coating properties desired. Addition of methacrylate units to the polymer will result in very durable coating while acrylate units can be used to increase coating flexibility. Thus, while this invention recites the use of a carboxy-containing addition polymer as one of the coating binder constituents, it is preferred that the addition polymer be a copolymer formed with a styrene or vinyl toluene unsaturated monomer. However, for individual purposes, an interpolymer, such as a terpolymer (i.e., styrene/acrylic acid/methyl methacrylate) can be used as the addition polymer. When an interpolymer is desired, the additional monomeric units will generally replace a portion of the styrene type monomer. These additional monomeric units can be esters of acrylic acid and methacrylic acid formed with $C_1$ to $C_{12}$ alkanol groups and monomers, such as 1,3-butadiene, chloroprene, acrylonitrile and substituted $C_1$ to $C_4$ homologues of these compounds, like isoprene, dimethyl-1,3-butadiene, methacrylonitrile, etc. As stated before, for select purposes, the additional monomeric units can replace all of the styrene type monomers, however, in as much as attractiveness, economy, and durability can best be obtained with styrene type monomers, it is preferable that an additional monomer not replace more than 10 percent of the styrene or vinyl toluene monomeric content.

In formulating the carboxy-containing addition polymer, the relative amounts of carboxy-containing and carboxy-free monomers are such that the resulting copolymer has an acid number between 10 and 150 and preferably between 20 and 100. Naturally to obtain the desired acid number, the weight proportions of the monomeric constituents will vary according to the particular monomers used, such as whether the carboxy-containing monomer is mono- or di-carboxylic. Generally, the addition polymer contains 85–95 parts by weight of carboxy-free monomer units and 5–15 parts by weight of carboxy-containing monomer units. For example, formulating a copolymer using monomers of styrene and acrylic acid, a monomer weight percentage ratio of 92/8 respectively, results in a copolymer with an acid number in the range of 57–67.

The carboxy-containing addition polymer can be prepared by any of the well known techniques, such as bulk, solution, or emulsion polymerization. Generally, the degree of polymerization is not critical so long as the polymer is a non-tacky solid at room temperature and has a minimum solubility of about 5% in volatile liquid organic solvents, such as xylol, toluol, benzol, "Solvesso" 100, etc. or a mixture of these.

In spite of the flexibility in the choice of polymerization methods, difficulty can be encountered in formulating the addition polymer. It is well known that the carboxy-containing monomers of this invention generally exhibit a higher polymerization reactivity than the above-mentioned carboxy-free vinyl unsaturated compounds. Thus, if all monomer addition is made at once, the likelihood of obtaining a non-uniform and incomplete addition polymer is greatly enhanced. Accordingly, a process useful for formulating the addition polymers of this invention has been developed. This process, useful for formulating an addition polymer consisting essentially of (1) 85–95 weight parts of a carboxy-free vinyl unsaturated compound, and (2) 5–15 parts of a carboxy-containing monomer having three to eight carbon atoms and at least one $\alpha,\beta$-double bond, comprises, in sequence: forming a resin mixture by adding, to a solvent refluxing at a temperature between 250° F. and 350° F., over a period of from three to five hours, a premix consisting essentially of more than 90 weight percent of the carboxy-free vinyl unsaturated compound (1) and less than 70 weight percent of the carboxy-containing monomer (2); refluxing said resin mixture for from ½ to 2 hours; adding to said resin mixture over a period of from three to five hours a premix consisting essentially of the remainder of the carboxy-free vinyl unsaturated compound (1) and the remainder of the carboxy-containing monomer (2); and refluxing the total resin mixture for at least two hours. The addition polymer formed by this process is quite uniform and the resin mixture shows excellent clarity. The solvents useful in this process are those such as aromatic naphthas, ketones, alcohols, or suitable mixtures of these solvents. Likewise, it is usually necessary in order to obtain practical polymerization rates, that a catalyst be present, usually in an amount from 0.2 to 3 weight percent based on the total monomer weight. Useful catalysts, which are generally added with the first premix, can be any free-radical generating polymerization catalysts, preferably of the peroxide type. Suitable examples of useful polymerization catalysts are ditertiary butyl peroxide, t-butyl peroxide, azobisisobutyronitrile, benzoyl peroxide.

It is preferred, particularly when the monomers of carboxy-free vinyl unsaturated compounds are styrene type (i.e., styrene or vinyl toluene) and the carboxy-containing monomers are acid type (i.e., acrylic acid or methacrylic acid), that the polymerization be accomplished in a four step process. Table I presents the percentage of each monomer, based on each monomer's total weight in the addition polymer, that makes up the premix added in each step. Table I also presents the length of time the addition for each step takes. The solvent to which the monomers are added is maintained at a reflux temperature between 275° F. and 325° F. and it is desirable to include a catalyst addition as presented above. It is to be understood that after the step 4 addition, all of the original amounts of each type monomer have been added.

TABLE I

| Step: | Addition Time | Monomers | Weight Percent of Total Weight of Individual Monomer |
|---|---|---|---|
| 1 | 3–4 hours | Styrene type | 95–100 |
|  |  | Acid type | 65–70 |
| 2 | ½–1½ hours | Styrene type | 0–5 |
|  |  | Acid type | 15–20 |
| 3 | do | do | 8–15 |
| 4 | do | do | 0–12 |

After the addition of step 1, the resin mixture is refluxed for about one hour before the addition of step 2. Likewise, after the step 4 addition is completed, reflux is continued from about two to four hours.

Example III presents a formulation of a styrene/acrylic acid copolymer that is preferred for use in this invention. In Example III, the copolymer contains 92 weight percent styrene units and 8 weight percent acrylic acid units.

EXAMPLE III.—STYRENE/ACRYLIC ACID COPOLYMER

| First portion: | Parts by weight |
| --- | --- |
| Xylol | 231.31 |
| "Solvesso" 100 [1] aromatic naphtha | 236.31 |
| Second portion: | |
| Glacial acrylic acid | 16.93 |
| Styrene | 291.82 |
| Di-tertiary butyl peroxide | 3.18 |
| Third portion: Glacial acrylic acid | 4.24 |
| Fourth portion: Glacial acrylic acid | 2.79 |
| Fifth portion: Glacial acrylic acid | 1.42 |
| Sixth portion: Xylol | 5.00 |

[1] Aromatic solvent of Humble Oil and Refining Company (B.P. 150° C.–190° C.; aniline point about −28° C.).

The first portion of Example III is mixed and heated to reflux at 292° F. and then for four hours, the second portion being previously premixed, is added to the first. After heating at the reflux temperature for one hour the third, fourth, and fifth portions are slowly added, each portion taking one hour for addition. The sixth portion is then added primarily to flush the lines and the resin mixture is refluxed for three hours. The degree of polymerization by this method is 99 to 100 percent. Table II presents some significant characteristics of the copolymer resin thus prepared.

Table II

| | |
| --- | --- |
| Solids (non-volatile), percent | 40±1 |
| Gardner-Holt viscosity | $Z_3$–$Z_5$ |
| Acid number | 57–67 |
| Color | 0 |
| Clarity | Excellent |

The previously described useful addition polymers are blended with epoxy resins to form coating binder compositions to which the catalysts of this invention are added. Suitable epoxy resins are those termed vic-epoxy resins and having more than one,

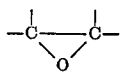

1,2-oxirane moieties per molecule. Vic-epoxies are generally obtained as condensation products of epichlorohydrin and dihydric, polyhydric, or polynuclear phenols in alkaline solution. A typical vic-epoxy is that formed by condensation of epichlorohydrin and diphenylolpropane. Diphenylolpropane is a bis-phenol resulting from acidic condensation of 2 mols phenol with 1 mole acetone. The resulting epoxy condensate can be represented by the structural formula:

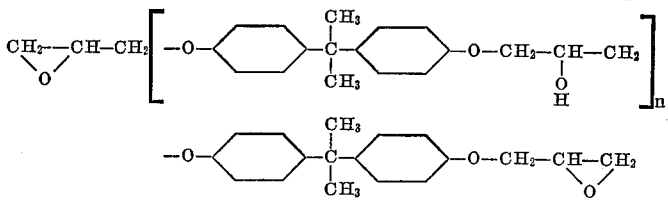

where $n$ is an integer 0, 1, 2, 3, etc., indicative of the degree of polymerization. The average molecular weight of the vic-epoxy condensate is preferably no greater than 3000 and, therefore, for an epoxy molecule containing two 1,2-oxirane moieties, the 1,2-oxirane equivalent weight should preferably be no greater than 1500. In particular, it is desirable to use an epoxy condensate with a 1,2-oxirane equivalent weight of from 190 to 1000. Preferred sources of epoxy condensates are those commercial products, such as "Epon" resins of Shell Chemical Company, and Dow Chemical Company's aliphatic epoxy, "Der 736." "Epon" resins are characterized as epichlorohydrin, bisphenol-A condensates available over a wide range of molecular weights. Particularly suitable is a liquid epoxy resin "Epon 828," characterized by an epoxy equivalent weight of about 200 and a melting point in the range of 8 to 12° C. Suitable epoxy condensates can be used individually or blended appropriately to give the desired 1,2-oxirane equivalent weight. Additionally they may be supplemented in an amount generally no greater than 10 percent by weight with such compounds as epoxidized unsaturated fatty acids, epoxidized esters of unsaturated fatty acids with alcohols, and esters of epoxy condensates having the aforementioned general formula, wherein one or more of the hydroxyls is esterified with a fatty acid.

In preparing the binder composition, the relative proportions of addition polymer and epoxy are selected such that on heating, cross-linking will occur to an extent sufficient to result in a coating with adequate and uniform adhesion to the applied surface. For a stable coating binder and good adhesion it is desirable that the molar ratio of carboxy groups in the addition polymer composition to 1,2-oxirane moieties in the epoxy composition be in the range from 0.1 to 4, and preferably from 0.3 to 2. Obviously, useful weight percentage ranges of the binder constituents will vary depending upon the selected compounds and their respective equivalent weights of 1,2-oxiranes and carboxylic acid groups. Ordinarily, the weight percentage of epoxy condensate in the binder blend is less than 50 percent and preferably less than 25 percent when optimum color retention of white and light colored coatings is desired. For a lower limit on the epoxy composition, it is desirable that it be greater than 5 parts by weight.

In formulating the eventual coating composition, it is customary to have the catalysts in solution, as shown in Examples I and II, and the addition polymer as a resin, as in Example III. The epoxy can be added directly, if a liquid resin, such as "Epon 828," or dissolved in a suitable solvent, if solid. As previously stated, the organic solvents used in the preparatory steps for the constituents of the eventual coating composition are not critically limited. A general requirement is that they evaporate from the applied coating during curing or baking steps. Any of the known volatile solvents, generally boiling in the range from 80° C. to 250° C., are suitable. The proporiton of solvent in the final coating composition can have a wide range of between 5 and 95 percent by weight with the higher solvent concentration being preferred when the coating composition is unpigmented.

When it is desired that the coating be colored, pigment can be directly added to the composition during the formulating step. Pigments ordinarily used in enamels, paints, and lacquers can be included in the coating composition of this invention generally to amounts ranging from 1 to 200 parts per 100 parts by weight of the binder composition. Prime pigments are ordinarily used in proportions up to 100 parts. At higher proportions, the total pigment usually is composed of an appropriate mixture of prime pigment and extender pigment. Suitable pigments include, metal oxides, hydroxides, or hydrous oxides, chromates, silicates, sulfates, sulfides, and carbonates, carbon black, organic dyestuffs and lakes thereof, metal flakes, and lamellar pigments such as mica. Because of the reactive carboxyl substituents of the addition polymer, use of strongly-basic, acid sensitive and reactive pigments is preferably avoided.

In addition to the various components mentioned above, other materials can be added to the coating composition of this invention to either modify or improve the composition for a pactiular end use. Thus, plasticizers, slip or anti-abrasion agents, metal driers, pigment dispersing agents, and surfactants, to mention but a few, can be added for selected purposes. Additionally, various resins may be added. Examples of some of the more common of these resins can be resinous polyesters, oil modified alkyl resins, phenol-formaldehyde resins, urea/formaldehyde/alkanol condensates, and melamine/formaldehyde/alkanol condensates.

The coating composition of this invention can be simply formulated by mixing together the various components, namely, catalyst mixture solution, addition polymer resin, and epoxy resin, at room temperature. For convenience, any pigment addition is primarily dispersed in a portion of the addition polymer resin by any ordinary pigment dispersion technique. Found particularly useful in the sand grinding technique as set forth in U.S. Patent 2,581,414.

Example IV presents a formulation for a preferred coating composition according to the present invention wherein all quantities are on a parts by weight basis. In Example IV, the parts by weight of the catalyst is of the solution as in Examples I and II and the weight parts of copolymer is of the resin as in Example III.

EXAMPLE IV

First portion: Parts by weight
Copolymer, Example III (resin) _____ 115.5
Solvesso 150, aromatic naphtha _____ 34.7
Butyl Cellosolve _____ 11.6
Titanium dioxide pigment ("Ti Pure" R-900)[1] _____ 300.4

Second portion:
Copolymer, Example III _____ 430.06
"Epon 828" _____ 38.52
Catalyst, Example I (solution) _____ 3.05
Catalyst, Example II (solution) _____ 1.53
Xylol _____ 77.50
_____
1,012.83

[1] E. I. du Pont de Nemours and Company for rutile titanium dioxide pigment.

The first portion is mixed and sand ground to a fineness of 0.5 mil, subsequent to which the second portion is added and mixed. The composition is characterized by a binder composition by weight of 85% copolymer (not solution) and 15% epoxy and has a pigment to binder ratio of 116 to 100. The coating composition is completely package stable at room temperature being free of gelation or significant bodying for periods of up to six months. For practical application of the coating with a hand spray, the composition is reduced 25% by volume with xylol and applied directly to a metal surface. Following a bake for 30 minutes of 300° F., the resulting enamel coating exhibits excellent adhesion, gloss, hardness, and chemical resistance.

Tests were conducted comparing the coating composition as given in Example IV with similar coating compositions, differing only in the curing catalyst used. In Table III: Sample A is the coating composition of Example IV; Sample B is the coating composition of Example IV, except that the catalyst (4.58 weight parts) is entirely the solution of Example I (i.e., quaternary ammonium salt of "Versatic 911" acid); and Sample C is the coating composition of Example IV, except that the catalyst (4.58 weight parts) is entirely the solution of Example II (i.e., quaternary ammonium salt of dioctyl sulfosuccinate). Samples A, B, and C were formulated in accordance with the procedure set forth in Example IV, and viscosity increases were observed over a period of time, keeping the samples in an oven maintained at 120° F. The coating compositions were also applied to a metal surface, as described above, and baked at 300° F. for 30 minutes. Subsequent to the bake, solvent resistance spot tests were conducted by a one minute application of xylol to the surfaces, and a subjective evaluation of the solvent resistance. Table III presents the results of these tests.

TABLE III

| | Sample A | Sample B | Sample C |
|---|---|---|---|
| Initial Viscosity [1] | 20″ | 19″ | 19″ |
| 3 week Viscosity [1] | 33″ | 130″+ | 18.5″ |
| 4 week Viscosity [1] | 31″ | Gelled | 19″ |
| Solvent Resistance | [2] Good 1 | [2] Good 2 | Poor |

[1] Viscosity determined by #3 Zahn cup after aging at 120° F.
[2] Where number follows subjective evaluation, it indicates order of preference (1 being preferred over 2).

A wide variety of surfaces may be coated with the composition of this invention. In particular, the composition of this invention is useful on surfaces of appliances, such as stoves and refrigerators, where a glossy appearance coupled with durability is desirable. The coating can be applied by any of the known operations, such as spraying, dipping, brushing, roller coating, and flow coating. The conditions under which the coating is cured are dependent upon the proportions of the two catalysts used, with the general curing time ranging from 10 to 60 minutes at a temperature between 250° F. and 450° F.

What is claimed is:

1. A curing catalyst consisting essentially of a mixture of two quaternary ammonium salts each having a cation of the structural formula

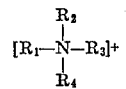

wherein $R_1$ is a $C_{12}$ to $C_{20}$ straight chain alkyl group, and $R_2$, $R_3$ and $R_4$ are individually selected from the group consisting of hydrogen and $C_1$ to $C_8$ alkyl groups, one of the organic anions of said salts being (A), an anion of a tertiary carboxylic acid having the structural formula

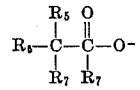

wherein $R_5$ is methyl and $R_6$ and $R_7$ are individually $C_1$ to $C_{12}$ alkyl groups, and the other being (B), an anion of a dialkyl sulfosuccinate having the structural formula,

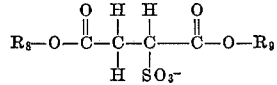

wherein $R_8$ and $R_9$ are $C_8$ to $C_9$ alkyl groups, the curing catalyst mixture having from 1 to 3 parts by weight of the quaternary ammonium salt of anion (A) to one part by weight of the quaternary ammonium salt of anion (B).

2. The curing catalyst of claim 1 wherein the $R_1$ radical substituent of the quaternary ammonium cation is a $C_{14}$ to $C_{18}$ straight chain alkyl group and $R_2$, $R_3$ and $R_4$ are $C_1$ to $C_4$ alkyl groups.

3. The curing catalyst of claim 2 wherein the catalyst mixture has about two parts by weight of the salt of anion (A) to about one part by weight of the salt of anion (B).

4. The curing catalyst of claim 3 wherein the $R_6$ and $R_7$ radical substituents of anion (A) are straight chain alkyl groups such that the $R_6$, $R_7$ carbon atoms sum is six to eight, whereby the total carbon atoms in anion (A) equals nine to eleven.

5. The curing catalyst of claim 4 wherein the quaternary ammonium cation is the octadecyltrimethyl ammonium cation and the $R_8$ radical substituent of the salt of anion (B) is a $C_8$ alkyl group.

6. A curing catalyst which consists essentially of a mixture of octadecyltrimethyl ammonium salts of (A), an anion having the structural formula,

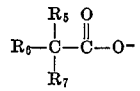

wherein $R_5$ is methyl and $R_6$ and $R_7$ are straight chain alkyl groups, such that the $R_6$, $R_7$ carbon atoms sum is about six to eight, and (B), 2-diethylhexyl sulfosuccinate, and wherein the mixture has about two parts by weight of the salt with anion (A) to about one part by weight of the salt with anion (B).

References Cited

UNITED STATES PATENTS

| | | | |
|---|---|---|---|
| 2,604,464 | 7/1952 | Segall | 260—837 XR |
| 3,048,552 | 8/1962 | Fang | 252—426 XR |
| 3,065,195 | 11/1962 | Vasta | 252—426 XR |
| 3,301,795 | 1/1967 | Wooster | 252—426 XR |

PATRICK P. GARVIN, Primary Examiner

PO-1050
(5/69)

UNITED STATES PATENT OFFICE
CERTIFICATE OF CORRECTION

Patent No. 3,480,560      Dated November 25, 1969

Inventor(s) Joseph A. Vasta

It is certified that error appears in the above-identified patent and that said Letters Patent are hereby corrected as shown below:

Column 10, lines 45 to 48, the structural formula should appear as shown below instead of as in the patent:

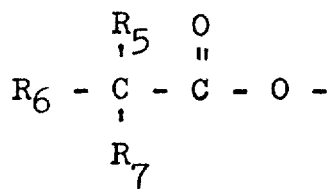

SIGNED AND
SEALED
MAR 10 1970

(SEAL)
Attest:

Edward M. Fletcher, Jr.
Attesting Officer

WILLIAM E. SCHUYLER, JR.
Commissioner of Patents